United States Patent [19]

Severinsky

[11] Patent Number: 5,253,157
[45] Date of Patent: Oct. 12, 1993

[54] HALF-BRIDGE INVERTER WITH CAPACITIVE VOLTAGE EQUALIZER

[75] Inventor: Alex J. Severinsky, Silver Spring, Md.

[73] Assignee: Premier Power, Inc., McLean, Va.

[21] Appl. No.: 831,918

[22] Filed: Feb. 6, 1992

[51] Int. Cl.⁵ ............................................ H02M 7/515
[52] U.S. Cl. ......................................... 363/98; 363/20;
363/132; 363/142; 323/266
[58] Field of Search ...................... 363/17, 20, 98, 132,
363/95, 97, 86, 142, 143; 323/266; 307/64, 66

[56] References Cited

U.S. PATENT DOCUMENTS

| | | | |
|---|---|---|---|
| 4,158,881 | 6/1979 | Simmons et al. | 363/25 |
| 4,639,849 | 1/1987 | Noworolski et al. | 363/56 |
| 4,935,861 | 6/1990 | Johnson, Jr. et al. | 363/132 |
| 4,980,812 | 12/1990 | Johnson, Jr. et al. | 363/44 |
| 5,068,573 | 11/1991 | Bruning et al. | 315/209 R |
| 5,099,410 | 3/1992 | Divan | 363/98 |
| 5,119,283 | 6/1992 | Steigerwald et al. | 363/37 |

Primary Examiner—Emanuel T. Voeltz
Assistant Examiner—Adolf Berhane
Attorney, Agent, or Firm—Banner, Birch, et al.

[57] ABSTRACT

A half-bridge inverter circuit is provided for converting a DC voltage source to an AC voltage waveform, and supplying the AC voltage waveform to a load. The half-bridge inverter includes an inverter comprising a first capacitor for supplying a positive output voltage and a second capacitor for supplying a negative output voltage during respective intervals of the output waveform. An equalizer, responsive to a control circuit, equalizes the voltage output from the first capacitor and the second capacitor in order to overcome non-symmetry of these voltages resulting from a non-symmetrical load.

28 Claims, 4 Drawing Sheets

POSITIVE HALF CYCLE

NEGATIVE HALF CYCLE

NEGATIVE CYCLE CURRENT IS LESS THAN POSITIVE CYCLE CURRENT
POSITIVE HALF CYCLE

HALF-BRIDGE INVERTER WITH CAPACITIVE VOLTAGE EQUALIZER

This invention relates generally to the field of electronic power conversion and, in particular, to uninterruptible power supplies (UPS). The invention uses low cost circuit topology in order to implement half-bridge inverters which are used in conjunction with a single source of reserve energy storage and an electric storage battery.

BACKGROUND OF THE INVENTION

There are number of UPSs known in the prior art which use half-bridge inverters and a single battery source. U.S. Pat. No. 4,935,861, which issued in the name of Johnson et al., describes one example of such a device. In the Johnson UPS, both capacitors C1 and C2 of the half-wave inverter are charged to the same voltage from a single battery source. Johnson uses a DC-DC converter to charge both capacitors. The charging current is the same for either capacitor. This condition creates a problem when the inverter load is not symmetrical because the load current values and waveforms then differ for positive and negative periods of an alternating voltage. In half-bridge inverter, one capacitor supplies energy during the positive portion of the output AC voltage and the other capacitor supplies energy during the negative portion. Thus, both capacitors will be discharged unequally by the non-symmetrical load but will be charged equally by identical current flow from a charger. This condition will lead to a total discharge of one capacitor which will render the inverter inoperable for its intended purpose due to its inability to produce a symmetrical AC voltage waveform.

SUMMARY OF THE INVENTION

The purpose of this invention is to overcome problems of the prior art associated with non-symmetrical loads as well as to eliminate DC leakage equalization resistors commonly used with capacitors connected in series.

DESCRIPTION OF THE PREFERRED EMBODIMENT

Figure 1:
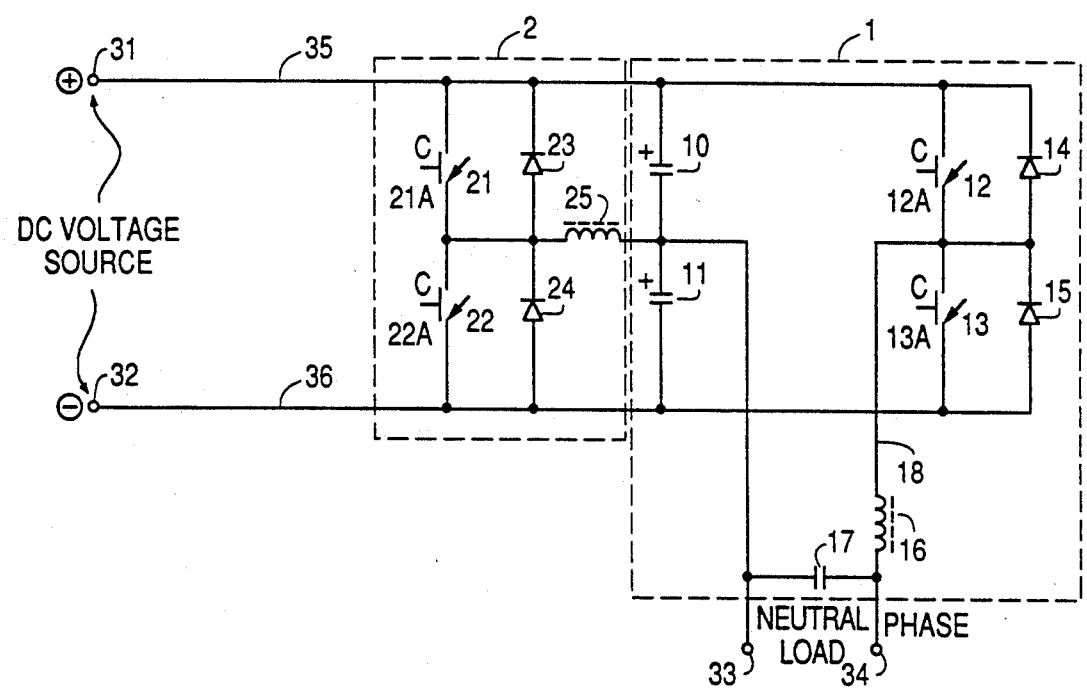
FIG. 1 is a block diagram of the power circuit of a half-bridge inverter with a capacitive voltage equalizer in accordance with the present invention.

With reference to FIG. 1, there is shown an inverter circuit 1, an equalizer circuit 2, input DC source terminals 31 and 32 and output AC terminals 33 and 34. In inverter circuit 1, there are three parallel circuits connected to buss conductors 35 and 36. Conductor 35 is connected to DC source terminal 31 to form a positive buss and conductor 36 is conducted to DC source terminal 32 to form a negative buss.

The first parallel circuit is formed of capacitors 10 and 11 connected in series with each other.

The second parallel circuit is formed of power semiconductor switches 12 and 13 connected in series with each other. Switches 12 and 13 have respective control terminals 12A and 13A. The direction of controllable current flow in both semiconductor switches is from positive buss conductor 35 to negative buss conductor 36. The function of control terminals 12A and 13A is to open and close the switches 12 and 13 in accordance with a control voltage. There are numerous semiconductor devices known in the prior art which can be used to perform this function such as bipolar transistors, Darlingtons, MOSFETS, IGBTS, GTOs, etc. Any one of these devices can be used for switches 12 and 13.

The third parallel circuit is formed of diodes 14 and 15 also connected in series with each other. The direction of current flow through both diodes is from negative buss conductor 36 to positive buss conductor 35.

The center connection of diodes 14 and 15 and the center connection of semiconductor switches 12 and 13 are connected in common via conductor 18 to one side of choke 16 which forms an output filter. The other side of choke 16 is connected to filter capacitor 17 and to output load terminal 34. The other side of capacitor 17 is connected to a center point of connection between capacitors 10 and 11, and to an output load terminal 33.

Equalizer 2 is formed of semiconductor switches 21 and 22, diodes 23 and 24, and choke 25. Switches 21 and 22 and diodes 23 and 24 are connected together with buss conductors 35 and 36 in a manner similar to switches 12 and 13 and diodes 14 and 15 in inverter 1. Because the current flow through switches 21 and 22 and diodes 23 and 24 is not as great as the current flow through their corresponding parts in inverter 1, their electrical ratings can be lower. Choke 25 is connected between the center connection point of switches 21 and 22 and the center connection point of capacitors 10 and 11 in inverter 1.

Figure 2:
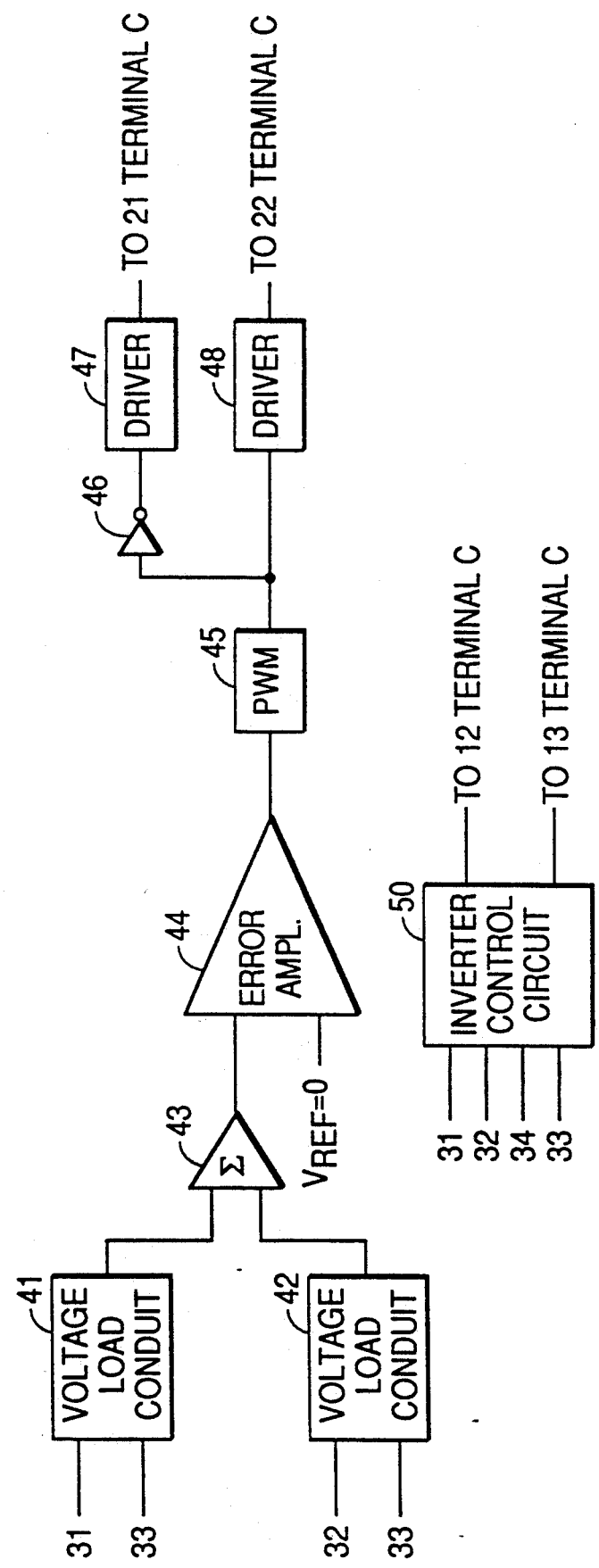
FIG. 2 is a block diagram of the control circuit of a half-bridge inverter with capacitive voltage equalizer in accordance with the present invention.

The control circuit of the present invention shown in (FIG. 2) is formed of voltage level conditioners 41 and 42. The function of these conditioners is to reduce power circuit voltage values and to shift its level if necessary so that common integrated circuits can be used to operate on those voltages. Voltage conditioner 41 has its input terminals connected to capacitor 10 via terminals 31 and 33. Voltage conditioner 42 has its input terminals connected to capacitor 11 via terminals 32 and 33. The transfer characteristics of voltage conditioners 41 and 42 are identical. There are numerous well known conditioner circuits known in the prior art, the simplest of which is a resistive divider.

The outputs of level conditioners 41 and 42 are supplied to summing amplifier 43. The output of a summing amplifier 43 is fed to one input of voltage error amplifier 44. The other input of voltage error amplifier 44 is tied to common a voltage reference point which has a zero voltage potential.

The output of error amplifier 44 is supplied to pulse width modulation (PWM) circuit 45. This circuit produces a series of pulses with a frequency much higher than the AC frequency of the voltage supplied to the load on terminals 33 and 34. The width of the pulses in relation to their repetition period is proportional to the voltage value on the input of PWM circuit 45 in such a way that when voltage on the input is zero the pulse duty ratio is 50%. When the input voltage is less than zero, the pulse width is less than 50% of the repetition period and when the input voltage is more than zero, the pulse width is larger than 50%. There are numerous well known PWM circuits in the art which can be used to accomplish the above described operation of PWM circuit 45.

The output of PWM circuit 45 is fed to driver 48 and through a logic inverter 46 to a driver 47. Both drivers 47 and 48 are identical and their function is to shift the level of the logic voltage in order to make it compatible with the level required by the control terminals of equalizer semiconductor switches 21 and 22 and to provide sufficient power to the control terminals. There are numerous driver circuits well known in the prior art which are based on transformers, optocouplers, and level shifters which can perform the function of drivers 47 and 48.

The output of driver 47 is supplied to the control terminal of switch 21 and the output of driver 48 is supplied to the control terminal of switch 22.

An inverter control circuit 50 is connected to input DC source terminals 31 and 32 and to output AC terminals 34 and 33. On the output, circuit 50 is connected to the control terminals of semiconductor switches 12 and 13. There are numerous inverter control circuits known in the prior art which can produce the desired regulated output voltage waveform which may be used to perform the function of control circuit 50.

The operation of inverter circuit 1 will now be described. When switch 12 is on, the positive voltage on capacitor 10 is applied across the output filter formed of choke coil 16 and capacitor 17. Then current through choke 16 starts increasing. When switch 12 is turned off, the choke current will be switched through diode 15. Inverter 1 is thus operating in a buck converter configuration. At this time, the negative voltage on capacitor 11 is applied to the input of the output filter components and current though choke 16 begins to decrease. If switch 12 is on and off for equal periods of time, the duty cycle is 50% and positive and negative voltage pulses on the input of the output filter are of equal duration but are opposite in polarity. The output filter acts as an averaging filter and therefore the output filter voltage will be zero.

If switch 12 has an on-state duty cycle greater than 50%, a positive voltage will appear on the filter output on load terminals 33 and 34. Switch 13 and diode 14 act in the same way as switch 12 and diode 15 but for a current flow through choke 16 in the opposite direction. When switch 13 has an on-state duty cycle greater than 50%, a negative voltage will appear on the filter output on load terminals 33 and 34.

Switches 12 and 13 are turned on and off in a complementary fashion, meaning that at any given time one of them is on and the other one is off. This means that the duty cycle of only one switch can be controlled as the other one is a simple logic compliment. By varying the duty cycle of the pulse turning a device on, it is possible to create an output voltage of any value from a positive value equal to the voltage on capacitor 10 (100% duty cycle for switch 12) to a negative value equal to the voltage on capacitor 11 (100% duty cycle for switch 13).

Because the existing known control circuit 50 for controlling the operation of switches 12 and 13 produces symmetrical pulse width modulation versus 50% duty cycle, it is important that voltages on capacitors 10 and 11 be equal. Otherwise, the positive and negative halfs of the output AC voltage waveform will be unequal which will have the effect of creating a DC offset voltage on the output. This offset is unacceptable as loads like transformers are in reality short circuits for DC voltage and will cause inverter semiconductor damage or shutdown by control circuits 50.

Equalizer switches 21 and 22 along with diodes 23 and 24 operate in essentially the same fashion as inverter switches 12 and 13 and diodes 14 and 15. At a 50% duty cycle, the average voltage on the connection point of the equalizer switches will be equal to exactly one half of the DC source voltage.

Choke 25, along with capacitors 10 and 11, act as an averaging filter for the voltage on the common connecting point of switches 21 and 22. The equalizer will then force the voltage at the common connecting point of capacitors 10 and 11 to be exactly one half of DC source voltage. This means that capacitor 10 will have a positive voltage with respect to the neutral output conductor equal to one half of the DC source voltage. Capacitor 11 will have a negative voltage with respect to the same neutral output conductor also equal to one half of the DC source voltage. This will satisfy the inverter control requirements that capacitor voltages be equal but of opposite polarity.

Equivalent circuit diagrams for current flow are shown on FIG. 3 and timing diagrams of currents in different parts of the circuit are shown on FIG. 4.

The timing diagram 4a shows one example of a non-symmetrical load current superimposed over a sine wave load voltage. On the same diagram there is shown a value of the current from the DC voltage source. Its value A equal to RMS value of the load current. Because positive half wave of the load current is substantially larger than negative one in the example shown, value A is much smaller than positive peak current and much larger than negative peak current.

Figure 3A:
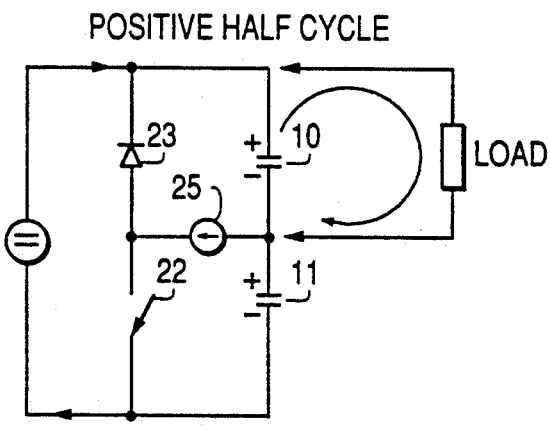
FIG. 3a-c, is a diagram showing the current flow in a UPS with a with non-symmetrical load.

The equivalent circuit in FIG. 3a depicts the operation for a positive half wave of the load voltage. During this time, the inverter connects the load to capacitor 10. The load current discharges through capacitor 10 and the DC source current charges capacitor 10.

Figure 4A:
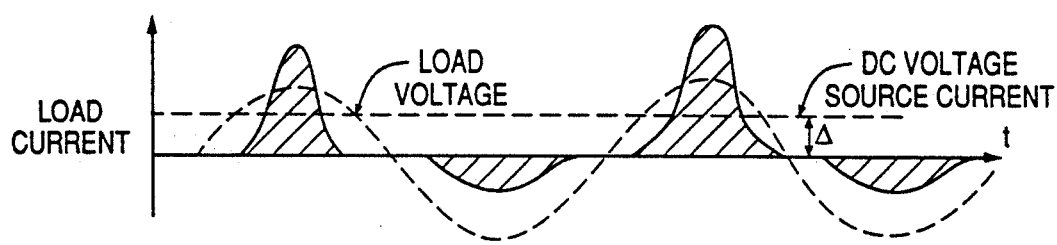
FIG. 4a-f is a timing diagram showing the current waveforms in a UPS with a non-symmetrical load.
Figure 4B:
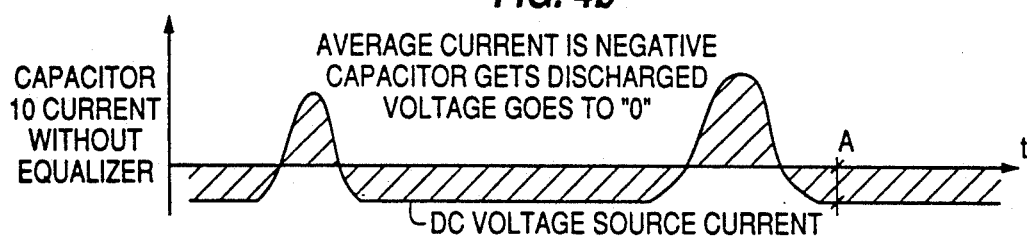

The timing diagram in FIG. 4b shows the current through capacitor 10 in the absence of an equalizer. Because the DC source charging current is smaller than the load discharge current, the integral of the total current over a cycle of voltage is not zero, rather has a positive discharge characteristic. This means that this capacitor will be discharged to a to zero voltage in the absence of an equalizer.

Figure 3B:
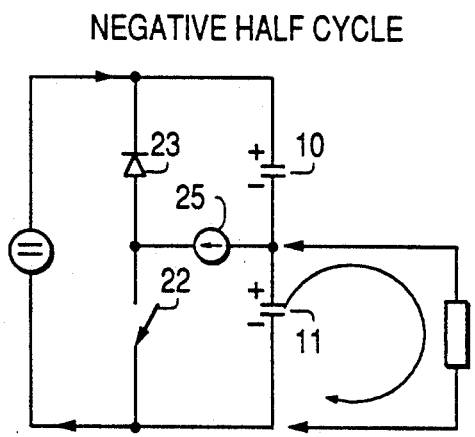

The equivalent circuit in FIG. 3b depicts the operation for a negative half wave of the load voltage. During this time, the inverter connects the load to capacitor 11. The load current discharges through capacitor 11 and the DC source current charges capacitor 11.

Figure 4C:
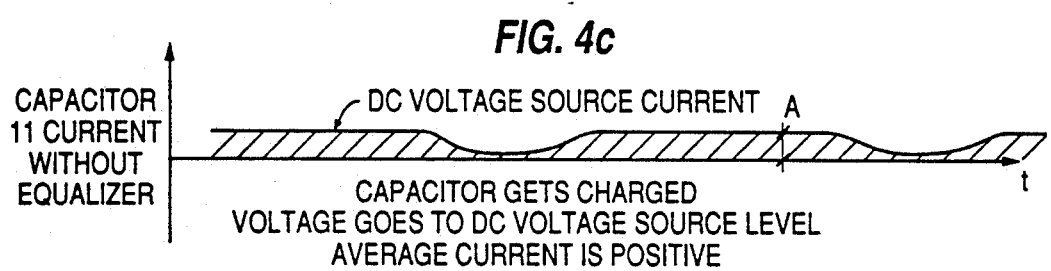

The timing diagram in FIG. 4c shows the current through capacitor 11 in the absence of an equalizer. Because the DC source charging current is larger than load discharge current, the integral of the total current over a cycle of voltage is not zero, but rather has a negative charge characteristic. This means that this capacitor will be charged to a full DC source voltage in the absence of an equalizer.

The effect of the equalizer is to provide an additional constant current source by the presence of choke 25. The current in this choke is regulated by the duty cycle of switch 22. This current additionally charges capacitor 10 via diode 23 when switch 22 is off. This current also discharges capacitor 11 via switch 22 when this switch is on. The value of this additional current is represented by B as shown on FIG. 4.

Figure 4D:
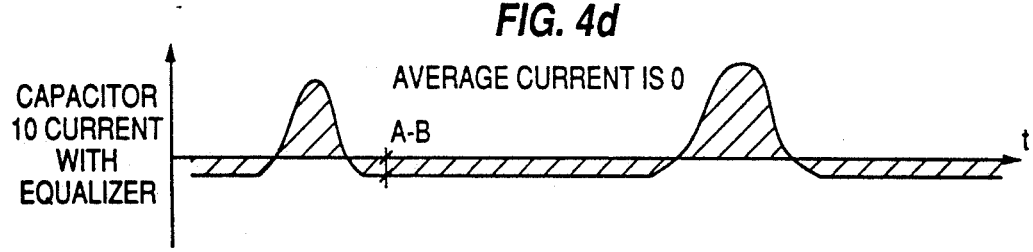
Figure 4E:
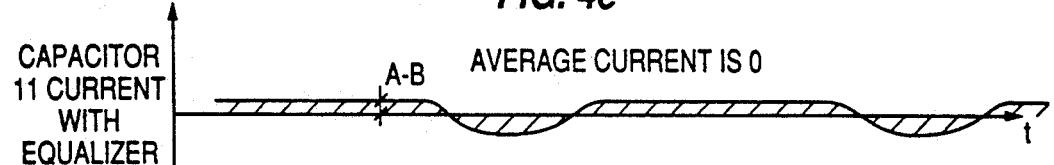
Figure 4F:
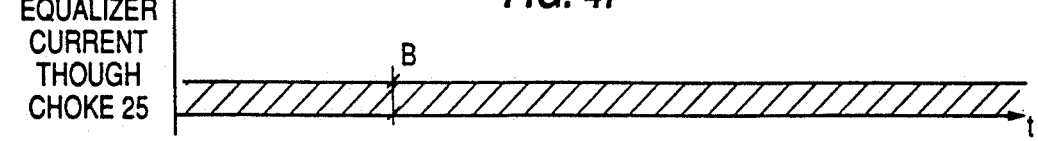

The DC source current represented by value A is offset in such a way that integrals of currents through both capacitors 10 and 11 during one cycle of the output voltage are equal to zero. This means that the voltage on the capacitors is maintained constant. FIGS. 4d, 4e, and 4f show the effect of this offsetting current. This offsetting current transfers the charge from capacitor 11 by discharging it via switch 22 to charge capacitor 10 via diode 23.

Figure 3C:
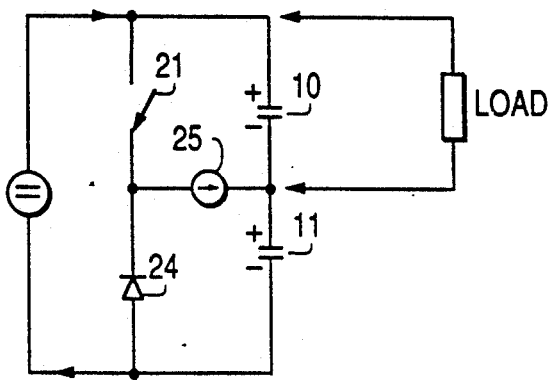

FIG. 3c illustrates the operation of the equalizer 10 when the negative half wave of the load current is larger than the positive have wave. In this case, current flow in choke 25 reverses direction and discharges capacitor 10 via switch 21 and charges capacitor 11 via diode 24.

The function of the control circuit is to regulate the duty cycle of switches 21 and 22 in such a way that the voltages on capacitors 10 and 11 are maintained equal. The operation of the system on non-symmetrical loads will thus be sustained. In order to achieve this result, level conditioners 41 and 42 translate the voltage on both capacitors to a logic voltage level. The output voltages of those conditioners are of opposite polarity just like voltages on capacitors 10 and 11.

The outputs of conditioners 41 and 42 are supplied to the inputs of summing amplifier 43. The output of amplifier 43 is zero when the capacitor voltages are equal. The output of amplifier 43 is connected to one input of error amplifier 44. The reference voltage input of this amplifier is connected to a common reference potential of zero volts. The output of error amplifier 44 is also zero when the capacitor voltages are the equal. The output is connected to the input of PWM circuit 45.

PWM circuit 45 generate a series of pulses at a frequency much higher than the frequency of the AC output voltage, on the order of 50 times or more. The duration of each pulse is 50% of the repetition period when the input voltage is zero. Pulse duration varies in proportion to the input voltage, not necessarily in a linear manner.

The output of PWM circuit 45 is suppled directly to driver 48 and to driver 47 via logic inverter 46. Inverter 46 creates the complementary drive signal required for the operation of switches 21 and 22. The driver circuits turn switches 21 and 22 on and off in synchronism with the PWM pulses.

In case of a symmetrical load, where the voltage on capacitors 10 and 11 is equal and the error amplifier voltage is zero, the duty cycle is 50% which maintains the capacitor voltages at an equal. When the load is non-symmetrical, the capacitor voltages become unequal and an error amplifier voltage appears on the input of the PWM circuit, the PWM circuit changes its pulse width in such a way that voltage difference on the capacitors becomes smaller, negative feedback. The gain of amplifier 44 determines the difference between the voltage on capacitors 10 and 11 under influence of a non-symmetrical load. This difference can be made as small as desired, e.g., 1% or 0.1%.

DC source can be a single phase rectifier or converter as well as a battery, alone or in conjunction with a voltage step-up boost converter. As it is clear from description of this invention, there are no adverse effects on inverter operation in the presence of non-symmetrical loads while being powered from a single DC voltage source.

While the present invention has been disclosed with respect to a preferred embodiment and modifications thereto, further modifications will be apparent to those of ordinary skill in the art within the scope of the claims that follow. Therefore, it is not intended that the invention be limited by the disclosure, but instead that its scope be determined entirely in reference to the claims which follow.

I claim:

1. A half-bridge inverter circuit adapted for converting a DC voltage source to an AC voltage waveform and supplying said AC voltage waveform to a load, wherein said half-bridge inverter circuit includes an inverter means comprising a first capacitor for supplying a positive output voltage relative to a ground voltage during the positive portion of said AC voltage waveform and a second capacitor for supplying a negative output voltage relative to said ground voltage during the negative portion of said AC voltage waveform, said half-bridge inverter circuit comprising:
   a first control means responsive to the level of said positive output voltage, said negative output voltage, and said ground voltage for selectively charging said first capacitor and said second capacitor, and
   an equalizer means responsive to said first control means for equalizing said positive output voltage supplied by said first capacitor and said negative output voltage supplied by said second capacitor.

2. A half-bridge inverter circuit according to claim 1, wherein said inverter means further comprises:
   an output filter means responsive to said positive output voltage, said negative output voltage, and said ground voltage for generating said AC voltage waveform.

3. A half-bridge inverter circuit according to claim 2, wherein said half-bridge inverter circuit further comprises:
   a second control means responsive to said positive output voltage, said negative output voltage, said ground voltage and said AC voltage waveform for controlling said positive output voltage and said negative output voltage.

4. A half-bridge inverter circuit according to claim 3, wherein said inverter means further comprises:
   a first inverter switching means responsive to said second control means for providing said positive output voltage to said output filter means, and
   a second inverter switching means responsive to said second control means for providing said negative output voltage to said output filter means.

5. A half-bridge inverter circuit according to claim 1, wherein said first capacitor and said second capacitor are connected in series.

6. A half-bridge inverter circuit according to claim 1, wherein the negative terminal of said first capacitor is connected to the positive terminal of said second capacitor, said negative terminal of said first capacitor and said positive terminal of said second capacitor corresponding to said ground voltage.

7. A half-bridge inverter circuit according to claim 6, wherein said equalizer means further comprises:
   a first equalizer switching means responsive to said first control means for selectively coupling said DC voltage source to said second capacitor to charge said second capacitor, and
   a second equalizer switching means responsive to said first control means for selectively coupling said DC voltage source to said first capacitor to charge said capacitor.

8. A half-bridge inverter circuit according to claim 7, wherein said equializer means further comprises:
 a choke means coupled between said first equalizer switching means, said second equalizer switching means, the negative terminal of said first capacitor, and the positive terminal of said second capacitor for providing said ground voltage equal to half of said DC voltage source.

9. A half-bridge inverter circuit according to claim 7, wherein said first control means comprises:
 summing means for summing said positive output voltage and said negative output voltage and generating a summed voltage,
 amplifying means responsive to said summing means for amplifying said summed voltage relative to said ground voltage,
 pulse width modulating means responsive to said amplifying means for generating a series of pulses, and
 driver means responsive to said pulse width modulating means for selectively activating said first equalizer switching means and said second equalizer switching means.

10. A half-bridge inverter circuit according to claim 9, wherein the frequency of said series of pulses is greater than the frequency of said AC voltage waveform.

11. A half-bridge inverter circuit according to claim 9, wherein the frequency of said series of pulses is 50 times greater than the frequency of said AC voltage waveform.

12. A half-bridge inverter circuit according to claim 9, wherein said driver means activates said first equalizer switching means during the absence of a pulse of said series of pulses.

13. A half-bridge inverter circuit according to claim 9, wherein said driver means activates said second equalizer switching means during the presence of a pulse of said series of pulses.

14. A half-bridge inverter circuit according to claim 9, wherein the duty cycle of said series of pulses varies proportionately responsive to said amplifying means.

15. A half-bridge inverter circuit according to claim 9, wherein said pulse width modulating means generates said series of pulses with a duty cycle of less than 50% when said summed voltage is less than said ground voltage.

16. A half-bridge inverter circuit according to claim 9, wherein said pulse width modulating means generates said series of pulses with a duty cycle of greater than 50% when said summed voltage is greater than said ground voltage.

17. A half-bridge inverter circuit according to claim 9, wherein said pulse width modulating means generates said series of pulses with a duty cycle equal to 50% when said summed voltage is equal to said ground voltage.

18. A half-bridge inverter circuit according to claim 1, wherein the positive terminal of said DC voltage source is connected to the positive terminal of said first capacitor, the negative terminal of said DC voltage source is connected to the negative terminal of said second capacitor, and the negative terminal of said first capacitor is connected to the positive terminal of said second capacitor, said negative terminal of said first capacitor and said positive terminal of said second capacitor corresponding to said ground voltage, said equalizer means further comprising:

a choke coupled between a first node and said ground voltage,
 a first switch couple between the positive terminal of said DC voltage source and said first node,
 a second switch coupled between the negative terminal of said DC voltage source and said first node,
 a first diode coupled between the positive terminal of said DC voltage source and said first node, so as to allow current to flow from said first node to the positive terminal of said DC voltage source, and
 a second diode coupled between the negative terminal of said DC voltage source and said first node, so as to allow current to flow from the negative terminal of said DC voltage source to said first node.

19. A half-bridge inverter circuit according to claim 18, wherein said first control means comprises:
 summing means for summing said positive output voltage and said negative output voltage and generating a summed voltage,
 amplifying means responsive to said summing means for amplifying said summed voltage relative to said ground voltage,
 pulse width modulating means responsive to said amplifying means for generating a series of pulses, and
 driver means responsive to said pulse width modulating means for driving said first switch and said second switch.

20. A half-bridge inverter circuit adapted for converting a DC voltage source to an AC voltage waveform and supplying said AC voltage waveform to a load, wherein said half-bridge inverter circuit includes an inverter means comprising a first capacitor for supplying a positive output voltage relative to a ground voltage during the positive portion of said AC voltage waveform and a second capacitor for supplying a negative output voltage relative to said ground voltage during the negative portion of said AC voltage waveform, said half-bridge inverter circuit comprising:
 a first control means responsive to the level of said positive output voltage, said negative output voltage, and said ground voltage for selectively charging said first capacitor and said second capacitor, and
 an equalizer means responsive to said first control means for equalizing a first output voltage supplied by said first capacitor and a second output voltage supplied by said second capacitor, said equalizer means including a first equalizer switching means responsive to said first control means for selectively coupling said DC voltage source to said second capacitor to charge said second capacitor, and a second equalizer switching means responsive to said first control means for selectively coupling said DC voltage source to said first capacitor to charge said capacitor, said control performing the steps of:
 (a) summing said positive output voltage and said negative output voltage
 (b) generating a summed voltage responsive to said summing step,
 (c) amplifying said summed voltage relative to said ground voltage,
 (d) pulse width modulating a series of pulses responsive to said amplifying step, and
 (e) selectively activating said first equalizer switching means and said second equalizer switching means responsive to said pulse width modulating step.

21. A half-bridge inverter circuit according to claim 20, wherein the frequency of said series of pulses modulated in said pulse width modulating step is greater than the frequency of said AC voltage waveform.

22. A half-bridge inverter circuit according to claim 20, wherein the frequency of said series of pulses modulated in said pulse width modulating step is 50 times greater than the frequency of said AC voltage waveform.

23. A half-bridge inverter circuit according to claim 20, wherein said selective activation step activates said first equalizer switching means during the absence of a pulse of said series of pulses.

24. A half-bridge inverter circuit according to claim 20, wherein said selective activation step activates said second equalizer switching means during the presence of a pulse of said series of pulses.

25. A half-bridge inverter circuit according to claim 20, wherein the duty cycle of said series of pulses varies proportionately responsive to said amplifying step.

26. A half-bridge inverter circuit according to claim 20, wherein said pulse width modulating means generates said series of pulses with a duty cycle of less than 50% when said summed voltage is less than said ground voltage.

27. A half-bridge inverter circuit according to claim 20, wherein said pulse width modulating means generates said series of pulses with a duty cycle of greater than 50% when said summed voltage is greater than said ground voltage.

28. A half-bridge inverter circuit according to claim 20, wherein said pulse width modulating means generates said series of pulses with a duty cycle equal to 50% when said summed voltage is equal to said ground voltage.

* * * * *